(12) United States Patent
Hamm (10) Patent No.: US 12,402,984 B2
(45) Date of Patent: Sep. 2, 2025

(54) DENTAL SYSTEM FOR SYMMETRY OF JAW, PALATE, AND TEETH

(71) Applicant: Susan E. Hamm, Shreveport, LA (US)

(72) Inventor: Susan E. Hamm, Shreveport, LA (US)

(*) Notice: Subject to any disclaimer, the term of this patent is extended or adjusted under 35 U.S.C. 154(b) by 0 days.

(21) Appl. No.: 18/903,840

(22) Filed: Oct. 1, 2024

(65) Prior Publication Data

US 2025/0017696 A1  Jan. 16, 2025

Related U.S. Application Data

(63) Continuation of application No. 16/922,575, filed on Jul. 7, 2020, now abandoned.

(60) Provisional application No. 62/871,424, filed on Jul. 8, 2019.

(51) Int. Cl.
*A61C 7/10* (2006.01)
*A61C 9/00* (2006.01)

(52) U.S. Cl.
CPC . *A61C 7/10* (2013.01); *A61C 9/00* (2013.01)

(58) Field of Classification Search
CPC ................ A61C 7/00; A61C 7/08; A61C 7/10
See application file for complete search history.

(56) References Cited

U.S. PATENT DOCUMENTS

| 6,062,854 A * | 5/2000 | Pozzi | A61C 7/10 433/7 |
| 2009/0098499 A1 | 4/2009 | Mitani | |
| 2010/0129766 A1 | 5/2010 | Hilgers | |
| 2016/0120624 A1 * | 5/2016 | Yousefian | A61C 7/10 433/17 |
| 2016/0270883 A1 | 9/2016 | Yousefian | |
| 2019/0159872 A1 * | 5/2019 | Atlan | A61C 7/10 |

FOREIGN PATENT DOCUMENTS

| CN | 108969127 A | * 12/2018 | A61C 7/00 |
| DE | 10234376 A1 | 2/2004 | |
| EP | 3216418 A1 | 9/2017 | |
| JP | 2017176822 A | 10/2017 | |
| KR | 20040085987 A | 10/2004 | |

OTHER PUBLICATIONS

Liu, A kind of removable space maintainer, 2018 (Year: 2018).*
Sciencedirect, Palate, https://www.sciencedirect.com/topics/neuroscience/palate, accessed 2023 (Year: 2023).
Decision to Grant a Patent for JP Application No. 2022-501163 dated Jan. 30, 2024 with translation.

(Continued)

*Primary Examiner* — Cris L. Rodriguez
*Assistant Examiner* — Sydney J Pulvidente
(74) *Attorney, Agent, or Firm* — Bracewell LLP; Constance G. Rhebergen; Keith R. Derrington (57) ABSTRACT

Dental apparatus, systems, and methods for providing anterior, lateral, and vertical movement, an apparatus including a posterior portion to be affixed to and supported by a posterior dental structure of a patient; and an anterior portion connected to and separable from the posterior portion, the anterior portion operable to provide anterior movement, lateral movement, and vertical movement to an anterior dental structure of the patient.

10 Claims, 5 Drawing Sheets (56) References Cited

OTHER PUBLICATIONS

EP Examination Report for EP Application Serial No. 20750890.4; Report Mail Date Aug. 25, 2023.
International Preliminary Report and Written Opinion for related PCT application PCT/US2020/041023 dated Jan. 11, 2022.
International Search Report and Written Opinion for related PCT application PCT/US2020/041023 dated Sep. 10, 2020.
JP 1st Office Action issued Jan. 31, 2023 in JP Application No. 2022-501163; pp. 1-10 with translation.
JP 2nd Office Action issued Sep. 12, 2023 in JP Application No. 2022-501163 with translation.
Office Action issued Jan. 31, 2023 in JP Application No. 2022-501163; pp. 1-10.
Decision to Grant Japanese Patent Application No. 2022-501163 and Allowed claims, "The jaw palate, a dental system for the right and left symmetry of a tooth", Jan. 30, 2024.

\* cited by examiner

DENTAL SYSTEM FOR SYMMETRY OF JAW, PALATE, AND TEETH

CROSS-REFERENCE TO RELATED APPLICATIONS

This application claims priority to and the benefit of co-pending U.S. patent application Ser. No. 16/922,575 filed Jul. 7, 2020, which claimed priority to and the benefit of U.S. Provisional Application Ser. No. 62/871,424, filed Jul. 8, 2019, the full disclosures of which are incorporated by reference herein in their entireties and for all purposes.

BACKGROUND

Field

Embodiments of the disclosure relate to insertable and adjustable dental expander devices. In particular, embodiments of the disclosure relate to insertable and adjustable dental expander devices to provide anterior, vertical, and/or anterior-lateral movement to teeth, a jawline, and/or palate for promoting aesthetically pleasing facial and/or dental structures.

Description of the Related Art

Dental expander devices are known, and generally expand outwardly in the lateral direction over time to provide spacing between teeth which lack proper spacing between them. For example, in children and young adults once "permanent" or adult teeth have replaced "baby" teeth, the teeth may be out of alignment, compacted, and co-located too close together. Prior to an orthodontist applying braces to straighten and align the teeth along with the upper and lower jawbones, upper and/or lower expanders may be applied to the top jaw and lower jaw. Such expanders may be semi-permanently attached for a period of time via dental cementation, or such expanders may be generally removable and re-insertable by the patient, removably affixing to portions of the teeth and/or palate.

Expanders generally expand in the lateral direction over time by a gear turned by a key. As the expander expands over time, spacing is provided between existing teeth. Once sufficient space is provided between existing teeth, expander use can be discontinued and braces, for example, can be applied to align teeth, optionally with other correction mechanisms, for example rubber bands, to align the upper and lower jaw of a patient. While expanders provide adequate lateral movement to provide spacing between teeth, no adequate technology exists for providing frontward (anterior) movement, vertical (downward or upward) movement, and/or anterior-lateral movement to teeth, a jawline, and/or palate for providing spacing, symmetry, and/or support to these dental structures.

SUMMARY

The disclosure presents dental and orthodontic appliances to promote and aid in developing symmetry and/or aesthetically pleasing facial structures in adults and children through remodeling, support, and expansion in one or more directions. In certain embodiments, a dental appliance can provide for controlled movement in multiple directions (planes) for dental structure movement in adults and children. For example, a single device may simultaneously provide the options for anterior, anterior-lateral, and vertical (downward or upward) movement (pressure). Importantly, devices of the present disclosure are compact and reduce bulkiness, while also providing a soft surface to reduce direct pressure and allow for 24-hour wear and slow, controlled movement. The exemplified devices do not impede speech while worn.

In some embodiments, fiber-impregnated materials such as high-strength, light-weight plastics or polymers are used. In some embodiments, acrylics can be used. High-strength, light-weight metals and wires can also be used. The use of light-weight wire technology allows for reduction in the number of screws or gears to provide necessary movement and expansion of the devices. One or more surfaces of the device in contact with oral tissue, gums, and/or teeth is optionally covered with a thin cover or coating of soft, gel-like material to distribute pressure and guard against painful pressure points. A suitable gel-like material is soft enough to prevent undue pressure on any particular point, but firm enough to provide gentle pressure/movement over time at particular points, such as at the inner front palate of a patient or at the inner side of the front teeth of a patient.

Systems and methods of the present disclosure can apply a computer generated evaluation of the best facial structure ratios for a particular patient, for example to result in required tooth/palate/jawline movement to achieve a face with best ratios and symmetry achieved through palate-tooth movement. In an embodiment, a dental professional uses a computer generated evaluation of the patient's current facial structure and the ideal movement required for the teeth and palate to determine how the teeth and palate must be moved to generate the suitable result, for example the forward movement of an upper or lower palate or teeth for the movement of a front upper or lower lip, respectively.

Three dimensional ("3-D") imaging can be used in certain embodiments to map out teeth and/or facial structure ratios and/or relationships, as well as aid in projecting movement of the teeth, palate, and/or facial structures, as well as placement of implants. Three dimensional imaging showing the position of facial features and soft tissue aids a dental services provider in planning movement to provide an aesthetically pleasing facial appearance. Three dimensional imaging applied to embodiments here include the projection of stressors and/or pressures necessary to achieve the desired result of dental component placement in addition to or alternative to facial appearance, as well as to avoid excessive pressure at one particular position. Pressure and/or movement created in surrounding teeth/soft tissue may be necessary to achieve desired movement that would be difficult or even contraindicated due to excessive pressure at one particular point. Three dimensional imaging in embodiments of the present invention allows for planning movement created in multiple planes and in multiple directions over time.

Once optimum position is obtained for teeth, a jawline, and/or palate to achieve a pre-determined best ratio or symmetry for a patient's face, devices of the present disclosure can be used to provide minimal but constant pressure to maintain the placement of the dental structure and to encourage bone development or maintenance. For example, as a patient ages and natural bone loss occurs, devices of the present disclosure allow for a soft, cosmetically-pleasing appearance to be obtained through movement of the teeth, jawline, and/or palate in the anterior, anterior-lateral, and/or vertical direction. Optimum forward pitch of a patient's teeth, jawline, and/or palate can provide lip support and other facial symmetry as a patient ages, providing a more youthful appearance. In some embodiments, only anterior movement can be required and provided, while in other embodiments only vertical movement can be required and provided.

Therefore, disclosed here is a dental device for providing anterior and vertical movement, the device including a posterior portion to be affixed to and supported by a posterior dental structure of a patient; and an anterior portion connected to and separable from the posterior portion, the anterior portion operable to provide anterior movement and vertical movement to an anterior dental structure of the patient. In some embodiments, the device is further configured to provide anterior-lateral movement to the anterior dental structure of the patient. Still in other embodiments, the posterior and anterior portion are connected by a wire, the wire operable to move in the anterior direction. In certain embodiments, the posterior and anterior portions have a hinge disposed therebetween to allow rotation of the anterior portion such that vertical movement and pressure are applied against an anterior dental structure of the patient. In certain embodiments, the hinge is adjustable and lockable. In certain embodiments, the hinge includes or is generated by an anterior joint and a posterior joint pivoting about the wire.

Still in other embodiments of the device, the posterior portion comprises a first posterior portion and a second posterior portion, and the anterior portion comprises a first anterior portion and a second anterior portion. In certain embodiments, a wire connects the first posterior portion, the first anterior portion, the second anterior portion, and the second posterior portion, and the wire is adjustable between the first anterior portion and second anterior portion to provide outward lateral movement of the first anterior portion and second anterior portion toward an anterior dental structure of the patient.

Still in other embodiments, the device comprises a first adjustable and lockable hinge between the first posterior portion and the first anterior portion, and the device further comprises a second adjustable and lockable hinge between the second anterior portion and the second posterior portion, the first and second hinges operable to rotate the first and second anterior portions to provide vertical movement toward and pressure on an anterior dental structure of the patient. Still in other embodiments, the posterior dental structure of the patient is selected from the group consisting of teeth, a jawline, and a palate.

In certain embodiments, the device provides symmetry to at least one anterior dental structure to provide facial symmetry to the patient in addition to lip support.

Still in other embodiments of the device, the device includes a screw base and a screw, where the screw is operable to allow for rotation in and out of the screw base such that the rotation provides movement and pressure in the anterior dental structure. The screw and screw based can be positioned anywhere in the device, for example in an anterior portion or posterior portion, or both, of the device.

Still in other embodiments, the device includes one or more attachable pads, the attachable pads positioned on the anterior portion of the device, where the attachable pad is operable to provide movement and pressure to the anterior dental structure.

Additionally, disclosed here is a method for providing pressure to an anterior dental structure of a patient, the method including determining a suitable level of facial symmetry for a patient and necessary movement of teeth, a palate, and/or jawline to achieve the suitable level of facial symmetry along with lip support; and providing anterior, vertical, and/or anterior-lateral movement to the teeth, a palate, and/or jawline to achieve the suitable level of facial symmetry. In some embodiments of the method, the step of providing anterior, vertical, and/or anterior-lateral movement comprises the use of the device described. In some embodiments, the step of providing anterior, vertical, and/or anterior-lateral movement further includes the step of bending the wire of the device described. In some embodiments, the step of providing anterior, vertical, and/or anterior-lateral movement further includes the step of adjusting the hinge of the device described. In some embodiments, the step of providing anterior, vertical, and/or anterior-lateral movement further includes the step of turning the screw out of the screw base of the device described.

Still in other embodiments, the step of providing anterior, vertical, and/or anterior-lateral movement further includes the step of adding an attachable pad to the device described, where the attachable pad is positioned on the anterior portion so that the attachable pad is operable to provide movement and pressure to the anterior dental structure.

In some embodiments, the step of determining a suitable level of facial symmetry for a patient and the necessary movement of teeth, a palate, and/or a jawline to achieve the suitable level of facial symmetry along with lip support includes the use of a computer generated evaluation.

Additionally, disclosed here is a method of manufacturing a dental device, including the steps of determining a suitable level of facial symmetry for a patient and necessary movement of teeth, a palate, and/or jawline to achieve the suitable level of facial symmetry along with lip support, taking a dental impression of the patient, and generating the dental device of claim 1 using the dental impression so that anterior, vertical, and/or anterior-lateral movement to the teeth, a palate, and/or jawline is provided to achieve the suitable level of facial symmetry. In some embodiments, the method of manufacture also includes the step of installing a hinge into the dental device, so that the hinge can generate the proper amount of anterior, vertical, and/or anterior-lateral movement. In some systems and methods described, only anterior movement or only vertical movement is provided to correct a dental structure for facial symmetry.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

So that the manner in which the features and advantages of the embodiments of apparatus, systems, and methods for anterior, anterior-lateral, and/or vertical dental structure movement, as well as others, which will become apparent, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

Figure 1:
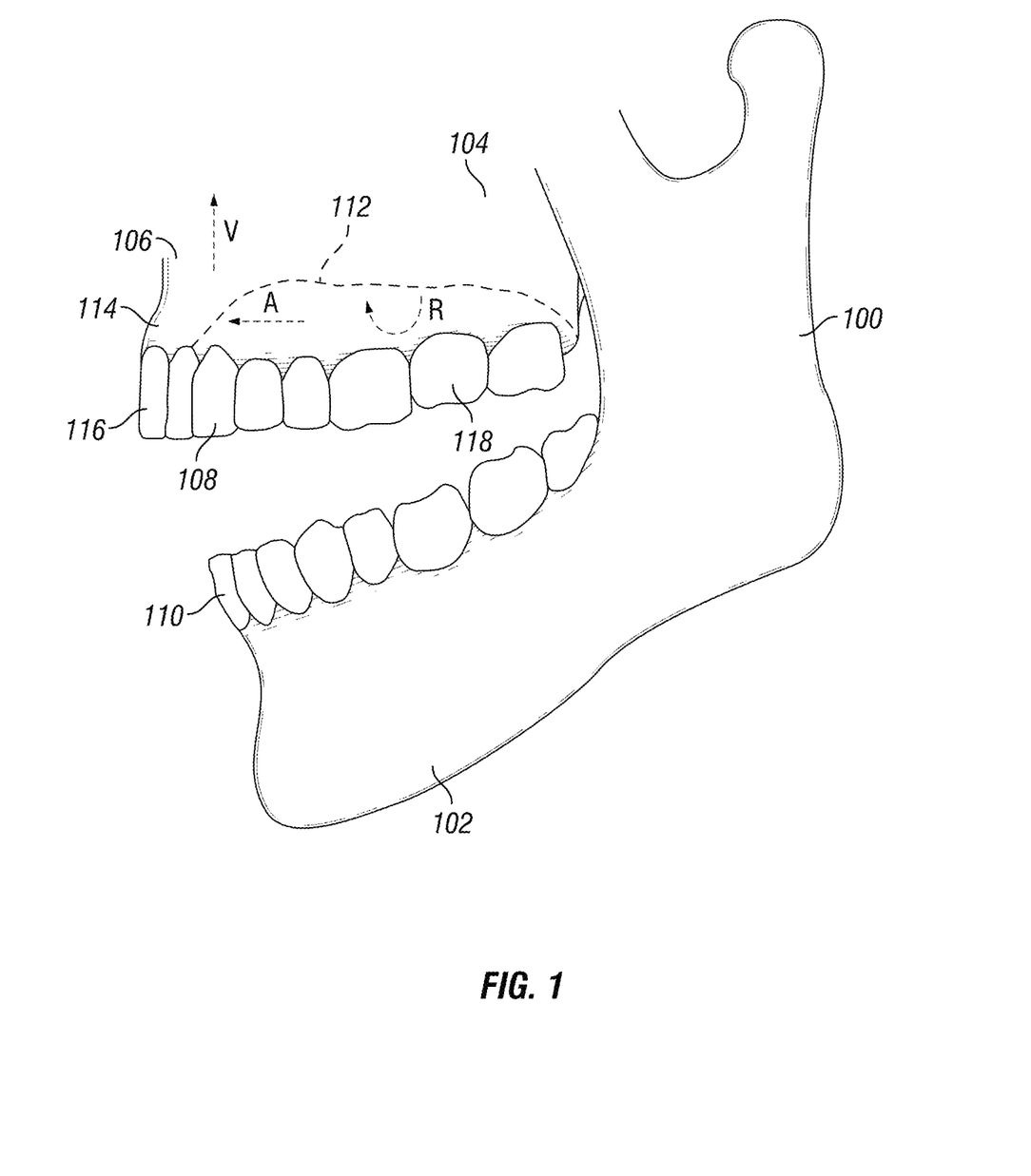
FIG. 1 shows a side view of a patient jaw structure including an outline of a device of the present disclosure.

Referring first to FIG. 1, a side view is shown of a patient jaw structure including an outline of a device of the present disclosure. In FIG. 1, patient jaw structure 100 includes lower jaw structure 102 and upper jaw structure 104. Upper jaw structure 104 includes upper palate 106 with upper plurality of teeth 108. Teeth 108 can include natural teeth and artificial teeth. Upper jaw structure 104 can also include posterior pre-existing dental structures 118. Posterior pre-existing dental structures 118 can be permanently or temporarily incorporated into upper jaw structure 104. Posterior pre-existing dental structures 118 can include natural structures such as teeth or artificial structures such as dental implants. Lower jaw structure 102 includes lower plurality of teeth 110. Placed within upper palate 106 is shown an outline of dental device 112, which is described further with regard to FIGS. 2-5. Dental device 112 can be inserted to be made semi-permanent via dental cementation or glue, or it can be removable and re-insertable by the patient and/or doctor. For example, dental device 112 can be custom manufactured to fit a patient-specific mold of upper palate 106 and upper plurality of teeth 108 so that dental device 112 grippingly fits within upper palate 106 and upper plurality of teeth 108. One or more metal extensions from dental device 112 can help secure dental device 112 amongst upper plurality of teeth 108 or amongst posterior pre-existing dental structures 118.

Upper front palate 114 and upper front teeth 116 experience anterior movement and pressure applied by dental device 112, shown with arrow labeled A. Upper front palate 114 and upper front teeth 116 can also, separately or simultaneously, experience vertical movement and pressure applied by dental device 112, shown with arrow labeled V. Such a vertical force V can originate through rotational movement of a device, such as one or more hinge. The rotational movement is referenced generally in FIG. 1 as the arrow labeled R, and the hinge is described further with respect to FIGS. 2 and 3. Forward anterior and/or upward vertical movement, optionally in addition to lateral movement, of the upper jaw structure 104 including upper palate 106 and upper plurality of teeth 108 allows for optimal placement of upper front palate 114 and upper front teeth 116 for lip support, bone structure support, and facial symmetry as determined by a patient's face best ratios for symmetry.

Importantly, such anterior, vertical, and/or lateral movements and pressure can be applied to one lateral side of a patient's mouth or to both lateral sides of a patient's mouth simultaneously. As described here throughout, a device is applied for movement in the upper portions of a patient's mouth such as upper jaw structure 104; however, one of ordinary skill in the art will understand such devices could be equally well applied in the lower portion of a patient's mouth to apply movement to lower jaw structure 102 including lower plurality of teeth 110.

Figure 2:
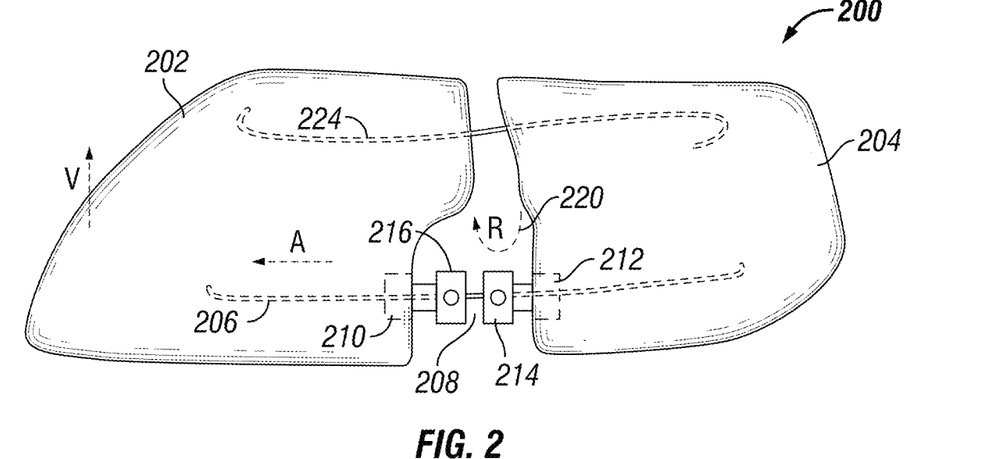
FIG. 2 shows a side view of a dental device of the present disclosure for use on an upper jaw structure of a patient to provide anterior, anterior-lateral, and/or vertical movement to components of an upper jaw structure.

Referring now to FIG. 2, a side view is shown of a dental device of the present disclosure for use on an upper jaw structure of a patient to provide anterior, anterior-lateral, and/or vertical movement to components of an upper jaw structure. Dental device 200 includes an anterior portion 202 and a posterior portion 204. Posterior portion 204 can be anchored to posterior pre-existing dental structures, for example posterior pre-existing dental structures 118. Anterior portion 202 can provide anterior, anterior-lateral, and/or vertical movement to pre-existing anterior dental components such as for example upper front palate 114 and upper front teeth 116, shown in FIG. 1. Connecting wire 206 connects anterior portion 202 with posterior portion 204, and in some embodiments ultimately connects four portions of the dental device, described in more detail with respect to FIG. 3C.

Forward movement of connecting wire 206 in the anterior direction of arrow A allows for anterior movement of anterior portion 202. Anterior rotational separation component 208 allows for one or more separation devices to separate anterior portion 202 from posterior portion 204. For example as shown, anterior rotational separation component 208 allows for anterior movement in direction A as connecting wire 206 moves in direction A, in one embodiment with the turn of a screw (described in more detail with respect to FIGS. 3A and 3B), and anterior rotational separation component 208 also allows for vertical movement of anterior portion in direction of arrow V by rotation R of anterior rotational separation component 208. Connecting wire 206 can also be slightly bent in the direction V as required to provide rotational pressure in direction R to upper front palate 114 and upper front teeth 116, and connecting wire 206 can also be bent slightly laterally outwardly to provide outward lateral pressure on either side of a patient's teeth.

Anterior movement A and vertical movement V of anterior portion 202 allows dental device 200 to apply pressure to upper jaw structure 104 including upper palate 106 and upper plurality of teeth 108 which in turn allows for optimal placement of upper front palate 114 and upper front teeth 116 for lip support, bone structure support, and facial symmetry as determined by a patient's face best ratios for symmetry.

In the embodiment of the anterior rotational separation component 208 as shown anterior base 210 is affixed in the material of anterior portion 202 and posterior base 212 is affixed in the material of posterior portion 204. Posterior joint 214 and anterior joint 216 can rotate independently and promote pivoting about connecting wire 206. In other words, hinge point 220 about which anterior portion 202 and posterior portion 204 can flex is created. In the embodiment shown, for example, turning posterior joint 214 and anterior joint 216 increases their separation from posterior base 212 and anterior base 210, respectively, and the lower portions of anterior portion 202 and posterior portion 204 separate, resulting in anterior movement A. Additionally, as posterior joint 214 and anterior joint 216 are turned and they separate from posterior base 212 and anterior base 210, respectively, a rotation of anterior portion 202 about hinge point 220, and a lifting of anterior portion 202, shown by "V" results. Thus, by turning posterior joint 214 and anterior joint 216, rotation R, anterior movement A, and vertical movement V occurs. In some embodiments, posterior joint 214, anterior joint 216, or both are turned in place, thus not resulting in separation of the posterior joint 214 and anterior joint 216 from the posterior base 212 and anterior base 210, resulting in little to no anterior movement A, but still resulting in rotation R and vertical movement V. The resulting forces applied to anterior portion 202 are transferred to upper jaw structure 104 including upper palate 106 and upper plurality of teeth 108 allows for optimal placement of upper front palate 114 and upper front teeth 116 for lip support, bone structure support, and facial symmetry as determined by a patient's face best ratios for symmetry.

Connecting wire 206 extends through components 208, 210, 212, 214, and 216, and is anchored into components 202, 204. The anterior-most and posterior-most portions of connecting wire 206 are positioned within anterior portion 202 and posterior portion 204, respectively. Connecting wire 206 is allowed to slip inside of anterior portion 202. This configuration allows components 208, 210, 212, 214, and 216 to move only axially along the connecting wire 206, preventing lateral separation in some embodiments. Stabilizing wire 224 connects anterior portion 202 and posterior portion 204 internally to provide additional support connecting the portions. Stabilizing wire 224 can provide additional force in the vertical or lateral plane by the bending of stabilizing wire 224.

In addition to anterior rotational separation component 208 or alternative to it, one or more simple adjustable and locking hinge could be disposed between anterior portion 202 and posterior portion 204 in addition to connecting wire 206. The hinge can be positioned on connecting wire 206. The adjustable and locking hinge can include gears, screws, or other mechanical mechanisms. For example as additional movement and pressure is desired on upper front palate 114 and upper front teeth 116 for lip support, bone structure support, and facial symmetry as determined by a patient's face best ratios for symmetry, a hinge between posterior portion 204 and anterior portion 202 could be loosened by a patient or dentist, slightly expanded in direction of rotation R to provide more arc between anterior portion 202 and posterior portion 204, and locked (for example with a screw or key mechanism) for wear.

Figure 3A:
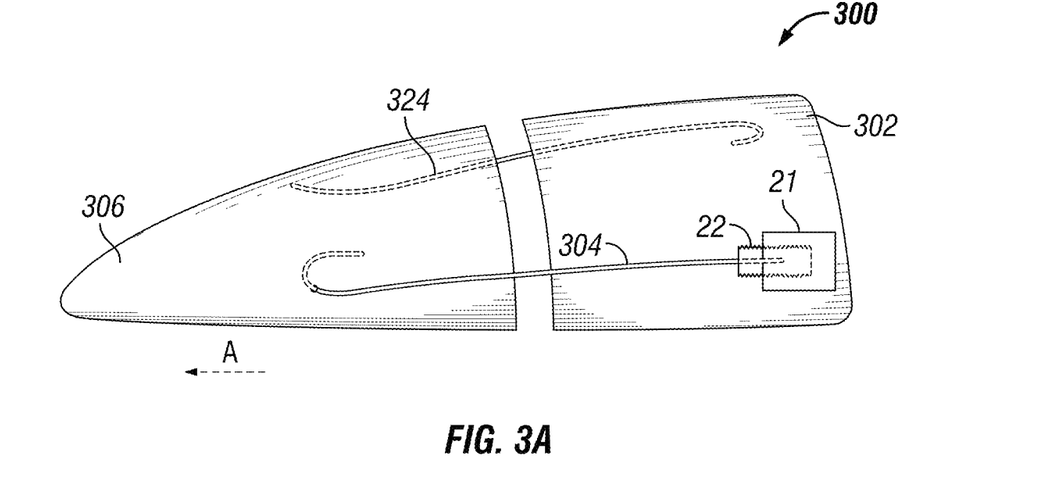
FIG. 3A shows a perspective view of a dental device of the present disclosure for use on an upper jaw structure of a patient to provide anterior, anterior-lateral, and/or vertical movement to components of an upper jaw structure.

FIG. 3A shows a side perspective view of a dental device of the present disclosure for use on an upper jaw structure of a patient to provide anterior, anterior-lateral, and/or vertical movement to components of an upper jaw structure. In dental device 300 with posterior portion 302, anterior component 306, and wire 304, screw base 21 is affixed to the rear of posterior portion 302, and screw 22 allows for rotation in and out of screw base 21. Wire 304 has one end which sits in screw 22 and an opposite end which is embedded into anterior component 306. As screw 22 is rotatingly turned to extend in the anterior direction A out of screw base 21, wire 304 also moves in the anterior direction A applying movement and pressure to anterior component 306. Stabilizing wire 324 connects anterior component 306 and posterior portion 302 to provide additional support connecting the portions. The resulting forces applied to anterior component 306 are transferred to upper jaw structure 104 including upper palate 106, and upper plurality of teeth 108 allows for optimal placement of upper front palate 114 and upper front teeth 116 for lip support, bone structure support, and facial symmetry as determined by a patient's face best ratios for symmetry. Wire 304 can also be bent slightly in a rotational movement to provide vertical pressure against a palate or jaw structure.

Figure 3B:
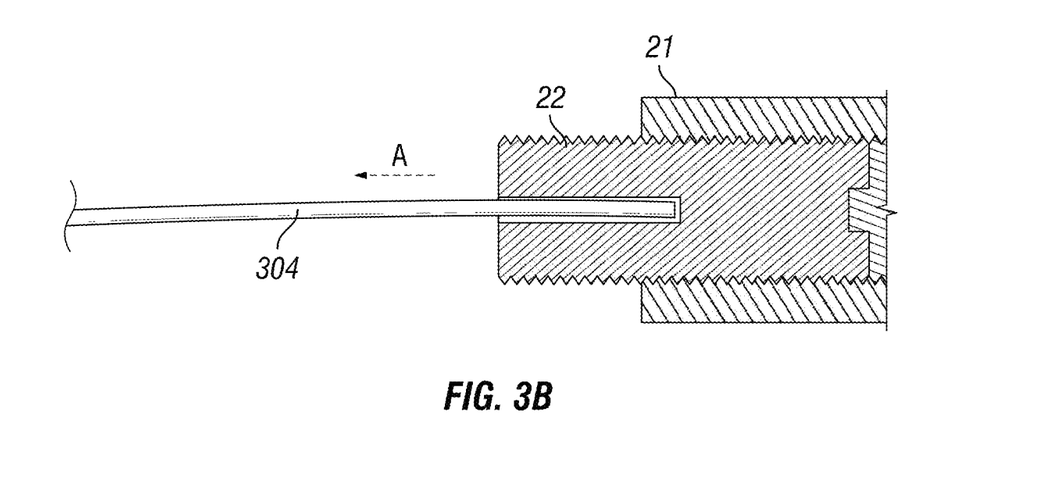
FIG. 3B shows a schematic of an example wire movement mechanism to provide anterior movement.

FIG. 3B shows an enlarged schematic of screw base 21 and screw 22 along with wire 304 from FIG. 3A. Wire 304 can be anchored in or otherwise attached to screw 22.

Figure 3C:
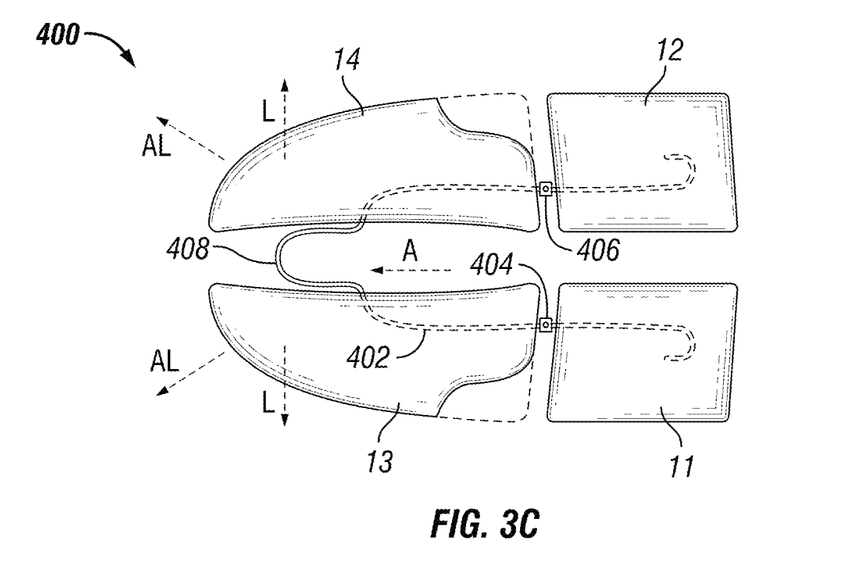
FIG. 3C shows a top view of a dental device of the present disclosure for use on an upper jaw structure of a patient to provide anterior, anterior-lateral, and/or vertical movement to components of an upper jaw structure.

FIG. 3C shows a top section view of a dental device of the present disclosure for use on an upper jaw structure of a patient to provide anterior, anterior-lateral, and/or vertical movement to components of an upper jaw structure. In device 400, posterior portions 11, 12 are shown connected to anterior portions 13, 14 by wire 402. As described with respect to FIGS. 2, 3A, and 3B, movement of wire 402 in the anterior direction A allows movement of either or both anterior portions 13, 14 in the anterior direction A which in turn allows for optimal placement of upper front palate 114 and upper front teeth 116 for lip support, bone structure support, and facial symmetry as determined by a patient's face best ratios for symmetry. The location of first hinge 404 between posterior portion 11 and anterior portion 13 and the location of second hinge 406 between posterior portion 12 and anterior portion 14 allow for rotational/vertical movement of either or both anterior portions 13, 14 as described with respect to FIG. 2.

In the embodiment of FIG. 3C, wire loop 408 is present in wire 402 between anterior portions 13, 14, and a patient or dentist can adjust wire loop 408 to be broader or narrower allowing for lateral movement L of anterior portions 13, 14. The anterior and lateral movement provided by adjustments of wire 402 allows for anterior-lateral movement of anterior portions 13, 14, shown as direction AL.

Figure 4:
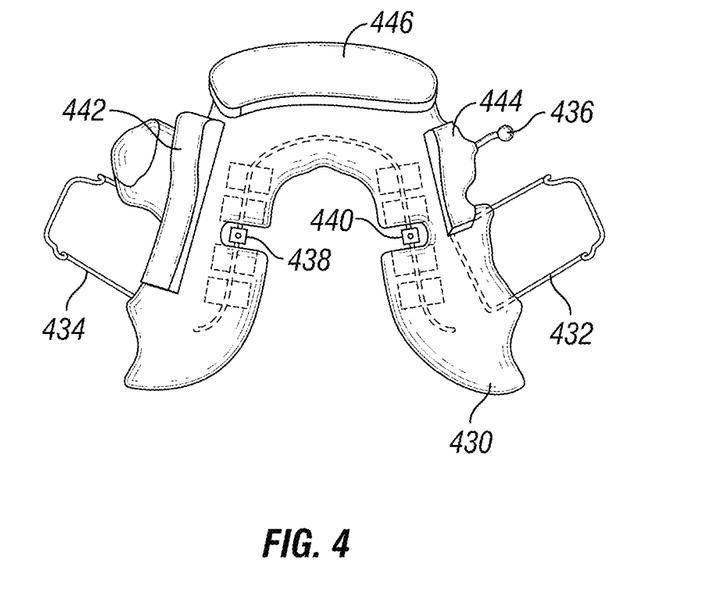
FIG. 4 shows a top view of an example embodiment a dental device of the present disclosure for use on an upper jaw structure of a patient to provide anterior, anterior-lateral, and/or vertical movement to components of an upper jaw structure.

FIG. 4 shows a top view of an example embodiment a dental device of the present disclosure for use on an upper jaw structure of a patient to provide anterior, anterior-lateral, and/or vertical movement to components of an upper jaw structure. Device 430 includes posterior teeth anchors 432, 434 and anterior teeth anchor 436 to stabilize device 430 in an upper dental structure of a patient, and expanding hinges 438, 440 allow for slow, gradual movement and expansion, along with pressure application, in the anterior, lateral, and vertical directions. The expanding hinges 438 and 440 can include any of the hinges disclosed herein. The device 430 includes soft pads 442, 444, and 446 made of a gel-like substance to distribute pressure and avoid painful pressure points. Soft pads 442, 444, and 446 provide additional pressure distributed along upper front palate 114 and upper front teeth 116. As additional soft pads 442, 444, and 446 are added, additional pressure is provided to upper front palate 114 and upper front teeth 116. Soft pads can be made out of any material that can provide padding and pressure distribution. Soft pads can be attachable to the dental device, and can be removable.

Figure 5:
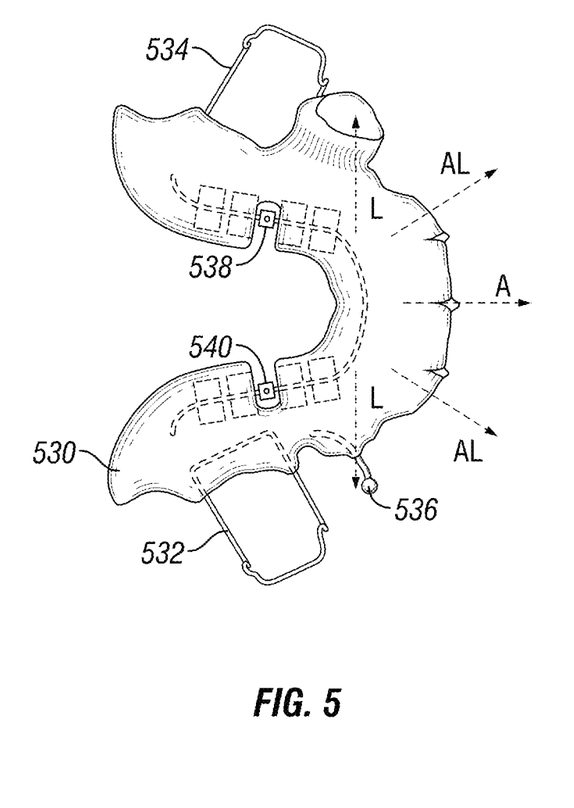
FIG. 5 shows a top view of an example embodiment a dental device of the present disclosure for use on an upper jaw structure of a patient to provide anterior, anterior-lateral, and/or vertical movement to components of an upper jaw structure.

FIG. 5 shows a top view of an example embodiment dental device 530 of the present disclosure for use on an upper jaw structure of a patient to provide anterior, anterior-lateral, and/or vertical movement to components of an upper jaw structure. The dental device has been molded to fit an individual patient's upper palate structure to sit flush against the upper front teeth. Dental device 530 includes posterior teeth anchors 532, 534 and anterior teeth anchor 536 to stabilize dental device 530 in an upper dental structure of a patient, and expanding hinges 538, 540 allow for slow, gradual movement and expansion, along with pressure application, in the anterior direction, labeled A; lateral direction, labeled L; anterior-lateral direction, labeled AL; and vertical direction (not shown). The expanding hinges 538 and 540 can include any of the hinges disclosed herein. In some other embodiments, only anterior or only vertical movement is provided, for example only on one lateral side of the device.

Figure 6A:
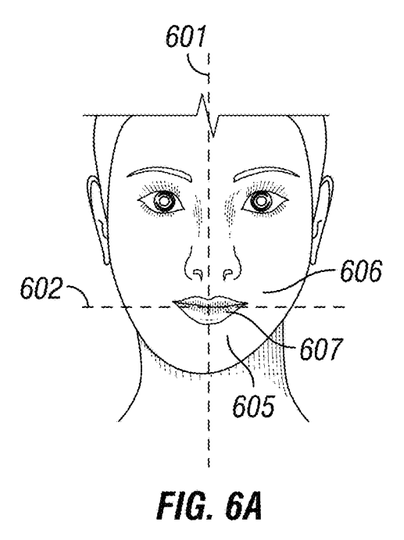
FIG. 6A shows a forward view of a patient with facial asymmetry.
Figure 6B:
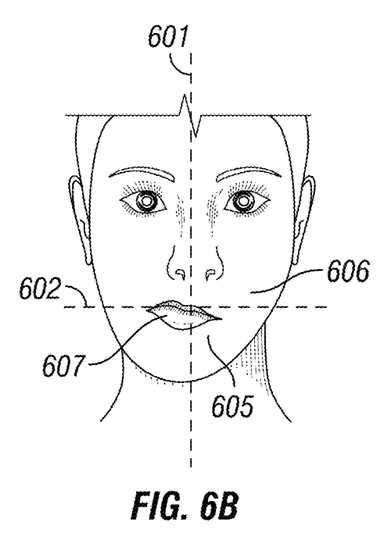
FIG. 6B shows a forward view of a patient with facial asymmetry.
Figure 6C:
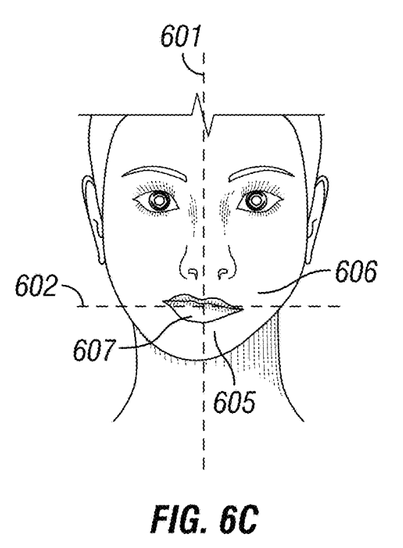
FIG. 6C shows a forward view of a patient with facial asymmetry.
Figure 6D:
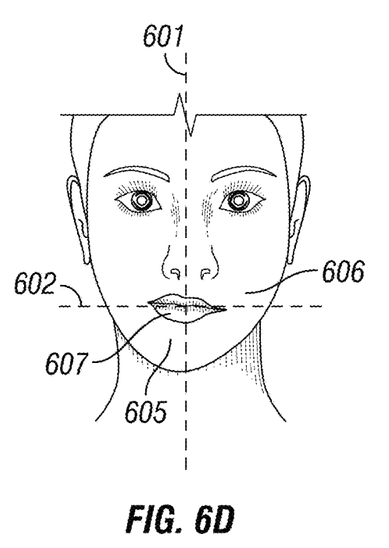
FIG. 6D shows a forward view of a patient with facial asymmetry.

FIGS. 6A, 6B, 6C, and 6D show various forms of facial asymmetry which can be fully or partially addressed by the devices disclosed herein. FIG. 6A depicts a face with mostly symmetrical upper jaw structure and lips, and an asymmetrical lower jaw. The asymmetry of lower jaw structure 605 can be seen by comparing the left and right sides of the lower jaw against vertical axis 601 and horizontal axis 602. Providing anterior and downward vertical force on the lower jawline and lower jaw structure 605 can provide improvements in facial symmetry, resulting in a more symmetrical appearance. FIG. 6B depicts a face with an asymmetrical upper jaw structure and asymmetrical lips, as well as inadequate lip support. Upper jaw structure 606 is asymmetrical across vertical axis 601. Lips 607 are asymmetrical across vertical axis 601 and are asymmetrically positioned across horizontal axis 602. Providing adequate lip support via anterior force and providing additional anterior and vertical force on portions of upper jaw structure 606 can result in repositioning of lips 607 and upper front palate 114, providing suitable levels of facial symmetry. FIG. 6C depicts a face with asymmetrical lips and inadequate lip support. Lips 607 are asymmetrical across vertical axis 601 and are asymmetrically positioned across horizontal axis 602. Providing adequate lip support via anterior and vertical force on upper teeth (not shown) and upper jaw structure 606 can result in suitable levels of facial symmetry. FIG. 6D depicts a face with asymmetrical lips and an asymmetrical lower jaw. Providing anterior and downward vertical force on the lower jawline and lower jaw structure 605 can provide improvements in facial symmetry, resulting in a more symmetrical appearance. Providing adequate lip support via anterior force and providing additional anterior and vertical force on portions of upper jaw structure 606 and upper front palate 114 can result in suitable levels of facial symmetry.

The singular forms "a," "an," and "the" include plural referents, unless the context clearly dictates otherwise.

In the drawings and specification, there have been disclosed embodiments of apparatus, systems, and methods for anterior, anterior-lateral, and/or vertical dental structure movement of the present disclosure, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

That claimed is:

1. A dental device for providing anterior and vertical movement, the device comprising:
   a posterior portion to be affixed to and supported by a posterior dental structure of a patient;
   an anterior portion connected to and separable from the posterior portion, the anterior portion that comprises a single device having a shape conforming to an upper palate and upper plurality of teeth of a patient, so that when the anterior portion is rotated in a direction against the upper palate and upper plurality of teeth, the upper palate and upper plurality of teeth are simultaneously moved in a vertical direction and in an anterior direction;
   a wire connecting the posterior and anterior portions that selectively moves in an anterior direction; and
   a hinge in the wire between the posterior and anterior portions that allows for selective rotation of the anterior portion with respect to the posterior portion.

2. The dental device of claim 1, wherein the hinge comprises an anterior joint and a posterior joint pivoting about the wire.

3. The dental device of claim 1, wherein the hinge is adjustable.

4. The dental device of claim 1, wherein the posterior portion comprises a first posterior portion disposed on a lateral side of the patient's mouth, and the anterior portion comprises a first anterior portion disposed on a lateral side of the patient's mouth, the dental device further comprising a second posterior portion disposed on a lateral side of the patient's mouth opposite the first posterior portion and a second anterior portion disposed on a lateral side of the patient's mouth opposite the first anterior portion, wherein the wire connects the first posterior portion, the first anterior portion, the second anterior portion, and the second posterior portion, and a loop is in the wire between the first anterior portion and second anterior portion, and wherein selectively adjusting a width of the loop provides outward lateral movement of the first anterior portion and second anterior portion into contact with an anterior dental structure of the patient that applies anterior, vertical, and lateral movements and pressure to both lateral sides of the patient's mouth simultaneously.

5. The dental device of claim 4, wherein the device comprises a first hinge between the first posterior portion and the first anterior portion, and where the device further comprises a second hinge between the second anterior portion and the second posterior portion, the first and second hinges operable to rotate the first and second anterior portions to provide vertical movement toward and pressure on an anterior dental structure of the patient.

6. The dental device of claim 1, wherein the anterior portion spans continuously a distance along the patient's palate in a direction lateral to the wire and a distance along the patient's palate in a direction along a length of the wire.

7. The dental device of claim 1, wherein the posterior dental structure of the patient is selected from the group consisting of a tooth, a jaw line, and a palate.

8. The dental device of claim 1, wherein the device provides bilateral symmetry to at least one anterior dental structure to provide facial bilateral symmetry to the patient in addition to lip support.

9. The dental device of claim 1, further comprising a screw base and a screw, wherein the screw is operable to be rotated in and out of the screw base such that the rotation provides movement and pressure to the anterior dental structure.

10. The dental device of claim 1, wherein the device further comprises an attachable pad, wherein the attachable pad is disposed on the anterior portion, and wherein the attachable pad is operable to provide movement and pressure to the anterior dental structure.

\* \* \* \* \*